US012361169B2

(12) United States Patent
Abrougui et al.

(10) Patent No.: US 12,361,169 B2
(45) Date of Patent: Jul. 15, 2025

(54) INTENT-BASED ENTERPRISE DATA MANAGEMENT FOR SIMPLIFIED DATA GOVERNANCE

(71) Applicant: Cisco Technology, Inc., San Jose, CA (US)

(72) Inventors: Kaouther Abrougui, Fremont, CA (US); Hazim Hashim Dahir, Wake Forest, NC (US); Ahmed Khattab, San Jose, CA (US); Kumarappan Palaniappan, San Jose, CA (US); Firas Fawzi Ahmed, Mississauga (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 227 days.

(21) Appl. No.: 17/851,470

(22) Filed: Jun. 28, 2022

(65) Prior Publication Data

US 2023/0418980 A1 Dec. 28, 2023

(51) Int. Cl.
*G06F 21/62* (2013.01)
*G06F 16/215* (2019.01)
*G06F 16/28* (2019.01)
*G06N 5/025* (2023.01)

(52) U.S. Cl.
CPC ........ *G06F 21/6254* (2013.01); *G06F 16/215* (2019.01); *G06F 16/285* (2019.01); *G06N 5/025* (2013.01); *G06F 2221/2111* (2013.01)

(58) Field of Classification Search
CPC .. G06F 21/6254; G06F 16/285; G06F 16/215; G06F 2221/2111; G06N 5/025
See application file for complete search history.

(56) References Cited

U.S. PATENT DOCUMENTS

2012/0215749 A1* 8/2012 Van Beneden ........ G06Q 10/10 707/694
2013/0268494 A1 10/2013 Tahiliani et al.
2014/0207786 A1* 7/2014 Tal-Rothschild ..... G06F 16/335 707/740
2017/0308715 A1 10/2017 Drost-Hansen et al.
2018/0191730 A1 7/2018 Deters et al.
2021/0099494 A1* 4/2021 Kuehr-McLaren ..... H04L 63/20
2022/0012363 A1* 1/2022 Colcord ............. G06F 16/2457

OTHER PUBLICATIONS

Helvoirt, et al., "Operationalizing Data Governance via Multi-level Metadata Management," 14th Conference on e- Business, e-Services and e-Society (13E), Oct. 2015, 13 pages.
Dehghani, "Data Mesh Principles and Logical Architecture," https://martinfowler.com/articles/data-mesh-principles.html, Dec. 3, 2020, 22 pages.

* cited by examiner

*Primary Examiner* — Normin Abedin
(74) *Attorney, Agent, or Firm* — Edell, Shapiro & Finnan, LLC

(57) ABSTRACT

Each module of a plurality of modules receives intent metadata associated with a data product instance of a data mesh. Each module corresponds to a unique data governance category of a plurality of data governance categories and a request associated with data was intercepted at the data product instance. Each module receives policy metadata associated with the data governance category corresponding to the module. Each modules determines, based on the intent metadata and the policy metadata, whether the request is valid for the data governance category corresponding to the module. Each modules transmits an indication of whether the request is valid for the module.

20 Claims, 4 Drawing Sheets

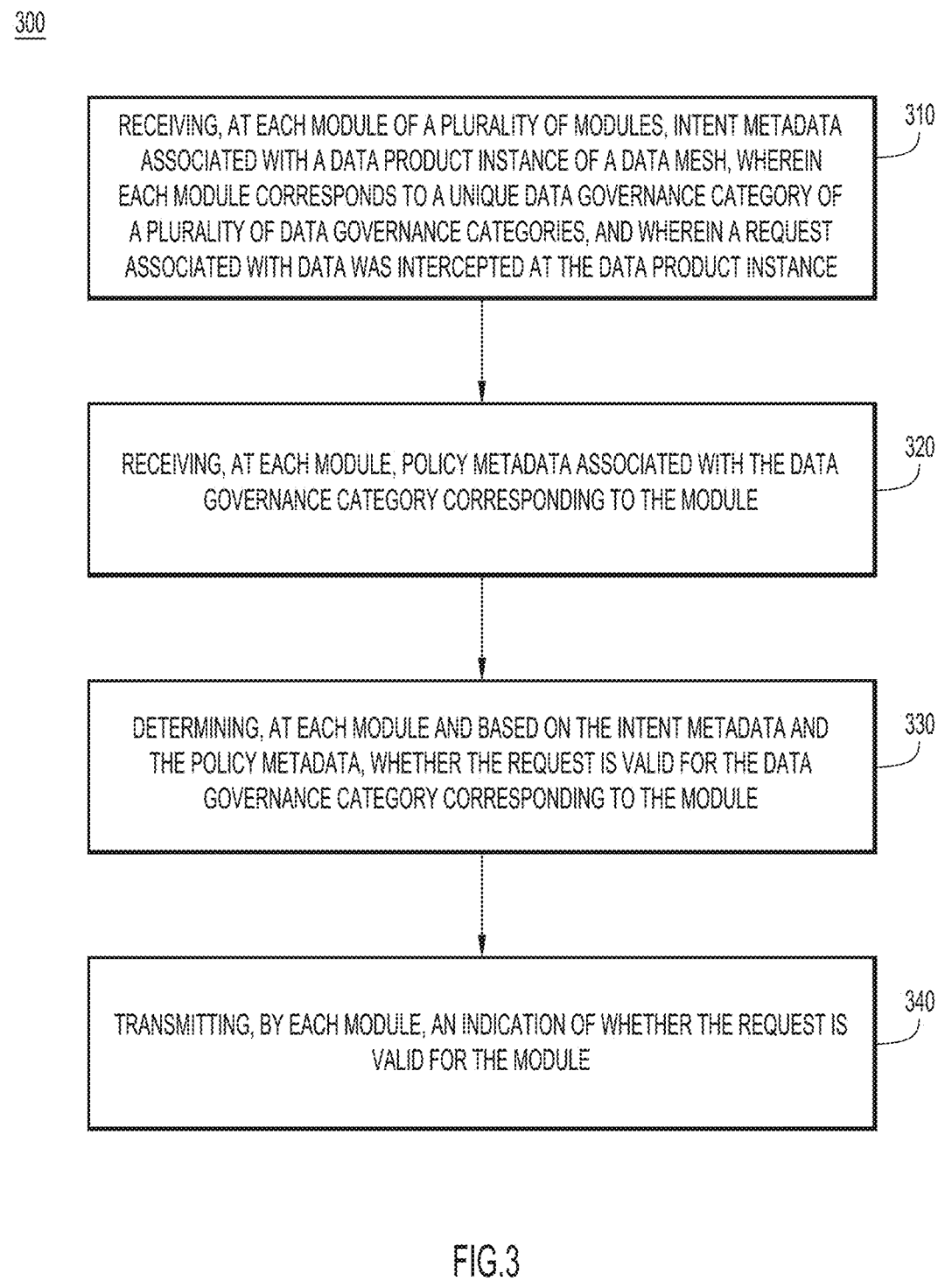

300

310: RECEIVING, AT EACH MODULE OF A PLURALITY OF MODULES, INTENT METADATA ASSOCIATED WITH A DATA PRODUCT INSTANCE OF A DATA MESH, WHEREIN EACH MODULE CORRESPONDS TO A UNIQUE DATA GOVERNANCE CATEGORY OF A PLURALITY OF DATA GOVERNANCE CATEGORIES, AND WHEREIN A REQUEST ASSOCIATED WITH DATA WAS INTERCEPTED AT THE DATA PRODUCT INSTANCE

320: RECEIVING, AT EACH MODULE, POLICY METADATA ASSOCIATED WITH THE DATA GOVERNANCE CATEGORY CORRESPONDING TO THE MODULE

330: DETERMINING, AT EACH MODULE AND BASED ON THE INTENT METADATA AND THE POLICY METADATA, WHETHER THE REQUEST IS VALID FOR THE DATA GOVERNANCE CATEGORY CORRESPONDING TO THE MODULE

340: TRANSMITTING, BY EACH MODULE, AN INDICATION OF WHETHER THE REQUEST IS VALID FOR THE MODULE

FIG.3

INTENT-BASED ENTERPRISE DATA MANAGEMENT FOR SIMPLIFIED DATA GOVERNANCE

TECHNICAL FIELD

The present disclosure relates to data governance.

BACKGROUND

Data governance defines the organizational structure, policies, rules, processes, business standards, and metrics for the end-to-end lifecycle of data from data acquisition and ingestion to storage, use, protection, archiving, and deletion. Some companies or enterprises offer many products across many countries. Due to the increased complexity while dealing with data governance, it is difficult to unlock value from data and speed up the cycle of intelligence. There are many limitations in the current data management systems that make it difficult to deliver valuable timely insights due to data governance limitations.

BRIEF DESCRIPTION OF THE DRAWINGS

FIG. 3 is a flow diagram illustrating a method of determining whether a request associated with data at a data mesh is valid, according to an example embodiment.

DESCRIPTION OF EXAMPLE EMBODIMENTS

Overview

In one embodiment, a method is provided for determining whether a request associated with data at a data mesh is valid. The method includes receiving, at each module of a plurality of modules, intent metadata associated with a data product instance of a data mesh, wherein each module corresponds to a unique data governance category of a plurality of data governance categories, and wherein a request associated with data was intercepted at the data product instance; receiving, at each module, policy metadata associated with the data governance category corresponding to the module; determining, at each module and based on the intent metadata and the policy metadata, whether the request is valid for the data governance category corresponding to the module; and transmitting, by each module, an indication of whether the request is valid for the module.

Example Embodiments

Embodiments described herein provide intent-based data management for simplified data governance. The end result is self-contained, self-aware, and self-secure data products that are compliant with the intended access and usage policies through automation and assurance at any given point in time.

Embodiments described herein leverage the data mesh, which is a decentralized architecture in which the unit of architecture is a domain-driven dataset that is treated as product and owned by domains or teams that are familiar with the data. The four principles of data mesh are domain-driven distributed architecture, product thinking, self-serve domain agnostic platform, and federated computational governance. Embodiments described herein augment the domain-agnostic platform with capabilities to armor data products' boundaries and enforce policies and rules as code based on encapsulated modules that are associated with different data concerns or attributes (e.g., data standardization, data sovereignty, data anonymization, etc.) and declarative definitions of rules and policies (e.g., through metadata). Any change to the policies may be injected and reflected on the intended data products.

Figure 1:
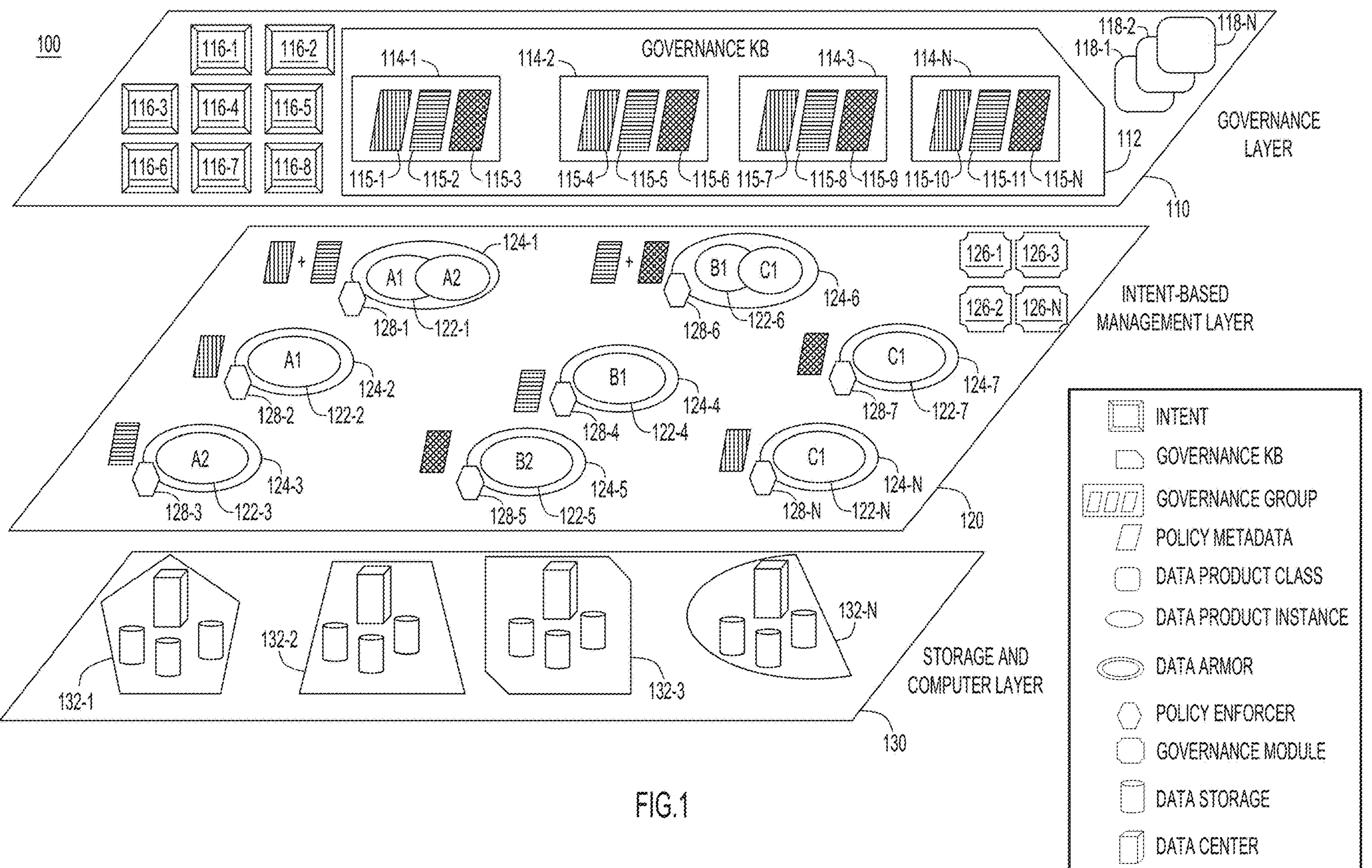
FIG. 1 is a block diagram of a data mesh environment configured to determine whether a request associated with data is valid, according to an example embodiment.

Reference is first made to FIG. 1. FIG. 1 shows a block diagram of a data mesh 100 that is configured to provide intent-based data management for simplified data governance. Data mesh 100 includes governance layer 110, intent-based management layer 120, and storage and compute layer 130.

Governance layer 110 contains details and information populated by data owners and advocates and is stored in a standardized format in a registry. Governance layer 110 is where data products are on-boarded or updated, polices are defined or modified, and intents are expressed.

Governance layer 110 includes a governance knowledge base 112 that encapsulates governance groups 114-1, 114-2, 114-3, . . . 114-N. Each governance group 114-1 to 114-N encapsulates policy metadata for a specific governance type or aspect. For example, one governance group 114-1 to 114-N may encapsulate policy metadata and rules for a set of countries, another governance group 114-1 to 114-N may be for data anonymization that encapsulates policy metadata and rules on what makes a successful anonymization for respective data product classes, etc. Governance knowledge base 112 stores the governance rules, laws, regulations, etc. with respect to countries, products, customers, etc. for the governance groups 114-1 to 114-N.

Each governance group 114-1 to 114-N stores policy metadata 115-1 to 115-N (including 115-1, 115-2, 115-3, 115-4, 115-5, 115-6, 115-7, 115-8, 115-9, 115-10 and 115-11 shown in FIG. 1) that define the policies and rules with respect to a respective governance group. For example, for a data sovereignty governance group, the policy metadata 115-1 to 115-N may include policies and rules for a specific country. For a data anonymization governance group, the policy metadata 115-1 to 115-N may include attributes that contribute to anonymization in a specific data product class 118-1, 118-2, . . . 118-N, described further below.

Governance layer 110 additionally includes intents 116-1 to 116-N(including intents 116-1, 116-2, 116-3, 116-4, 116-5, 116-6, 116-7 and 116-8 shown in FIG. 1), which are the connection between the governance layer 110 and the intent-based management layer 120. Each intent 116-1 to 116-N states the policies to be applied for a specific data product instance for each data product class behavior. Policy metadata 115-1 to 155-N are injected into respective data product instances and the policies are enforced through the respective governance modules 126-1 to 126-N(including 126-1, 126-2 and 126-3 shown in FIG. 1) in the intent-based management layer 120. For example, an intent 116-1 to 116-N for a data product instance A1 could be:

A1::GM1::GG1::PM::DPC:collect:-X, which expresses an intent to depict that at any given point in time, data product instance A1 is to comply with data sovereignty requirements enforced through governance module 1 (GM1) and defined in governance group 1 (GG1). The "collect" behavior of data product instance A1 can happen from anywhere except country X, and is to comply with the country policies from which it was collected.

A1::GM1::GG1::PM::DPC:store:=Y, which expresses an intent to depict that at any given point in time, data product instance A1 is to comply with data sovereignty requirements enforced through GM1 and defined in GG1. The "store" behavior of data product instance A1 can happen only in country Y, and is to comply with the country policies in which it is stored.

A1::GM1::GG1::PM::DPC:cache:-X,Z, which expresses an intent to depict that at any given point in time, data product instance A1 is to comply with data sovereignty requirements enforced through GM1 and defined in GG1. The "cache" behavior of data product instance A1 can happen anywhere except countries X and Z, and is to comply with the country policies in which it is cached.

A1::GM1::GG1::PM::DPC:backup:, which expresses an intent to depict that at any given point in time, data product instance A1 should comply with data sovereignty requirements enforced through GM1 and defined in GG1. The "backup" behavior of data product instance A1 can happen anywhere and is to comply with the country policies in which it is cached.

A1::GM2::GG2::DPC:anonymize, which expresses an intent to depict that at any given point in time, data product instance A1 is to comply with data anonymization requirements enforced through governance module 2 (GM2) and defined in governance group 2 (GG2).

Governance layer 110 further includes data product classes 118-1 to 118-N. Each data product class 118-1 to 118-N represents the encapsulated data for a specific product or service (e.g., data collected through collaboration systems, network telemetry, etc.). Each data product class 118-1 to 118-N has attributes and behaviors. Each attribute is described so the data set is easy to understand (e.g., using the name of the data set, the description of each feature, the units, correlation information, etc.). A behavior defines the different ways a data product class can be invoked. In general, for each data product class 118-1 to 118-N, the data is acquired, ingested, processed, etc. The information about data product class attributes and behaviors is stored in a standardized and classified format in the registry.

When different data product instances (e.g., data product instance A1 and data product instance A2) are used to generate a new data product instance (e.g., data product instance A1A2, as illustrated by data product instance 122-1 in FIG. 1), the latter data product instance inherits the rules and policy metadata from both data product instances and is to comply with intents from data product instance A1 and data product instance A2. Additional intents may also be added to the resulting data product instance.

Intent-based management layer 120 includes data product instances 122-1 to 122-N (including 122-1, 122-2, 122-3, 122-4, 122-5, 122-6 and 122-7 shown in FIG. 1), which are the result of instantiating a data product class 118-1 to 118-N in a specific context. Therefore, a data product instance 122-1 to 122-N encapsulates a data set per product, per customer, etc. A data product instance is a microservice that can be deployed as a container inside a pod.

Data armor 124-1 to 124-N(including 124-2, 124-3, 124-4, 124-5, 124-6 and 124-7 shown in FIG. 1) defines the security boundaries of data product instances 122-1 to 122-N. Data in the storage and compute layer 130 cannot be accessed unless it is accessed via data product instances 122-1 to 122-N. The data armor 124-1 to 124-N is a process in the data product instance 122-1 to 122-N that denies any access to data sets by default. Each data armor 124-1 to 124-N interacts with a corresponding policy enforcer 128-1 to 128-N(including 128-1, 128-2, 128-3, 128-4, 128-5, 128-6 and 128-7 shown in FIG. 1) to determine and allow actions on data sets if the actions are valid.

Each data product instance 122-1 to 122-N additionally includes different types of ports. For example, a data product instance 122-1 to 122-N may include an input data port, which is the vehicle to feed input data to a data product instance that can come through Representational State Transfer (REST) Application Programming Interfaces (APIs), batch, or streaming data. An output data port represents datasets in polyglot format that can be used by data analysts to create dashboards and visualizations or by machine learning engineers to use in their machine learning training models. Output data ports may be used by downstream data product instances for more processing, correlation, and aggregations. The data sets generated by output data ports can also be stored and are subject to governance rules and policies. A control data port is a process used for logs and metrics allowing continuous enhancement of the data product.

Intent-based management layer 120 additionally includes data governance modules 126-1 to 126-N. Each data governance module 126-1 to 126-N focuses on a specific data governance aspect (e.g., data governance modules 126-1 to 126-N may include a data sovereignty module, a data anonymization module, a data standardization module, a data access module, etc.). Each data governance module 126-1 to 126-N is associated with a corresponding governance group 114-1 to 114-N and corresponding governance modules and governance groups focus on the same data governance aspect. Each data governance module 126-1 to 126-N is a plugin that can be applied to a data product instance 122-1 to 122-N and receives as input files including policy metadata 115-1 to 115-N from its corresponding governance group 114-1 to 114-N. Each data governance module 126-1 to 126-N is a service that enforces the policies from intents 116-1 to 116-N on the data product instances 122-1 to 122-N at runtime. Each data governance module 126-1 to 126-N defines the mechanisms to enforce the policies on the data product instances 122-1 to 122-N.

Each policy enforcer 128-1 to 128-N is an interceptor of all interactions with a corresponding data product instance 122-1 to 122-N. A policy enforcer 128-1 to 128-N may be implemented as a sidecar in the corresponding data product instance 122-1 to 122-N that intercepts requests and enforces the rules and policies specified in intents 116-1 to 116-N. A policy enforcer 128-1 to 128-N continuously pulls intents 116-1 to 116-N specified by a data owner of a data product instance 122-1 to 122-N. A policy enforcer 128-1 to 128-N may intercept a request associated with data at a data product instance 122-1 to 122-N and push respective intents 116-1 to 116-N to respective data governance modules 126-1 to 126-N in response to intercepting the request.

Storage and compute layer 130 is the data infrastructure plane of the data mesh that profiles the underlying infrastructure required to store data products and run pipelines. Storage and compute layer 130 includes data storage 132-1 to 132-N(including 132-1, 132-2 and 132-3 shown in FIG. 1) that may include data centers, databases, data warehouses, data lakes, etc., that are located across the globe and leverage cloud providers' regions. Data mesh 100 is a global data mesh that spans many countries and regions.

According to embodiments described herein, policies put forth by data owners and regulators are translated into policy metadata 115-1 to 115-N that is broken down or divided into groups of governance type (e.g., a sovereignty group, a data anonymization group, etc.). The policy metadata 115-1 to 115-N is derived from the policies set by the data owner of data product instances. The groups of policies are applied on various intents 116-1 to 116-N. The intents 116-1 to 116-N are another layer of abstraction created by a set of governance rules to allow a level of granularity to specify intents per data product, per accepted behavior, and per governance group 114-1 to 114-N. In this context, the accepted behaviors correspond to actions that may be taken with respect to data (e.g., access data, store data, backup data, delete data, etc.).

As an example, to understand the concept of intents, assume a German-based company is using a U.S.based videoconferencing service that leverages a U.S.based cloud provider. From a sovereignty perspective, data would be subject to German law, but also would be subject to U.S. laws because the data is processed by an American company, even if the data is stored in a European data center. Therefore, in this example, storing and processing are "acceptable" behaviors of the videoconferencing product. The sovereignty intents are defined for these data product "behaviors."

In addition, in this example, the videoconferencing data product may have a specific level of privacy, require specific levels of encryption, and access control (e.g., depending on who is able to access the data or where the data is accessed, processed or stored). The privacy intents are defined for the videoconferencing data product for each of its behaviors. Intents can be as agile and granular as needed to define a set of policies per data product, per behavior, per governance group, etc. An intent may also be parameterized and leverage a reasoning engine to determine the exact policy that needs to be applied depending on parameters extracted from the data or depending on different triggers.

According to embodiments described herein, each governance group 114-1 to 114-N specified on governance layer 110 has a corresponding governance module 126-1 to 126-N in intent-based management layer 120 to automate enforcement of policies. Each governance module 126-1 to 126-N defines the blueprints of its corresponding governance group 114-1 to 114-N and executes its respective blueprints based on the specific intents per data product. Each policy enforcer 128-1 to 128-N of a data product instance 122-1 to 122-N continuously pulls the intents specified by the data owner of the data product instance and pushes respective intents to respective governance modules 126-1 to 126-N(e.g., when a request associated with data at a data product instance 122-1 to 122-N is received). Each governance module 126-1 to 126-N additionally pulls respective policies from its corresponding governance group 114-1 to 114-N, enforces policies as code, and reports back to the policy enforcer 128-1 to 128-N of a data product instance 122-1 to 122-N. In this way, each governance module 126-1 to 126-1 applies policies pertaining to the governance type associated with the governance module and reports information associated with the governance type to the policy enforcer 128-1 to 128-N.

Returning to the example discussed above, assume that a videoconferencing data product controls data sets collected from videoconferencing sessions in which a videoconferencing assistant was used for a meeting taking place in Germany. In this example, the transcript of the meeting is a data set managed by a data product instance (e.g., arbitrarily referred to herein as data product instance 122-I) and being protected by data armor (e.g., arbitrarily referred to herein as data armor 124-I) through policies compiled from the intents 116-1 to 116-N. The intents contain policies relating to a number of different governance types (e.g., sovereignty related policies, privacy related policies, etc.). In this case, the policy enforcer of data product instance 122-I (e.g., policy enforcer 128-I) pushes sovereignty intents to the sovereignty governance module and pushes privacy intents to the privacy governance module, etc. Each governance module 126-1 to 126-N receives the respective intents and pulls policy metadata 115-1 to 115-N from its corresponding governance group 114-1 to 114-N(e.g., the governance group associated with the same governance type or aspect).

Each governance module 126-1 to 126-N(e.g., sovereignty governance module, privacy governance module, etc.) verifies the state of the data sets controlled by data product instance 122-I and makes sure it is compliant or served with compliant with the desired data product intent based on the requested behavior and the requestor context. The respective governance module 126-1 to 126-N transmits the outcome to policy enforcer 128-I, which gives real time observability within the data mesh 100 into the current compliance state of the data product instance 126-I and its managed data.

In other words, each governance module 126-1 to 126-N determines whether a request associated with the data set is valid (or a behavior associated with the data set is acceptable) for the governance type associated with the governance module based on the intents 116-1 to 116-N received from policy enforcer 128-I and the policy metadata 115-1 to 115-N associated with the governance type that was received from the corresponding governance group 114-1 to 114-N. Each governance module 126-1 to 126-N transmits an indication of the validity of the request to the policy enforcer 128-I. If all governance modules 126-1 to 126-N confirm that the request is valid for the governance type associated with the governance module, the policy enforcer 128-I reports a positive result to the data armor 124-I with details needed for completing the request.

According to additional embodiments described herein, because the intents 116-1 to 116-N and the metadata 115-1 to 115-N are continuously or periodically being transmitted to governance modules 126-1 to 126-N, if the policies defined in the governance groups 114-1 to 114-N or in the intents 116-1 to 116-N are newly created or updated, the governance modules 126-1 to 126-N continuously receive the latest policy metadata/intents. In this way, embodiments described herein ensure that the latest policy metadata/intents are applied to the data sets by governance modules 126-1 to 126-N, which gives real time observability into the compliance state of data products in data mesh 100.

Figure 2:
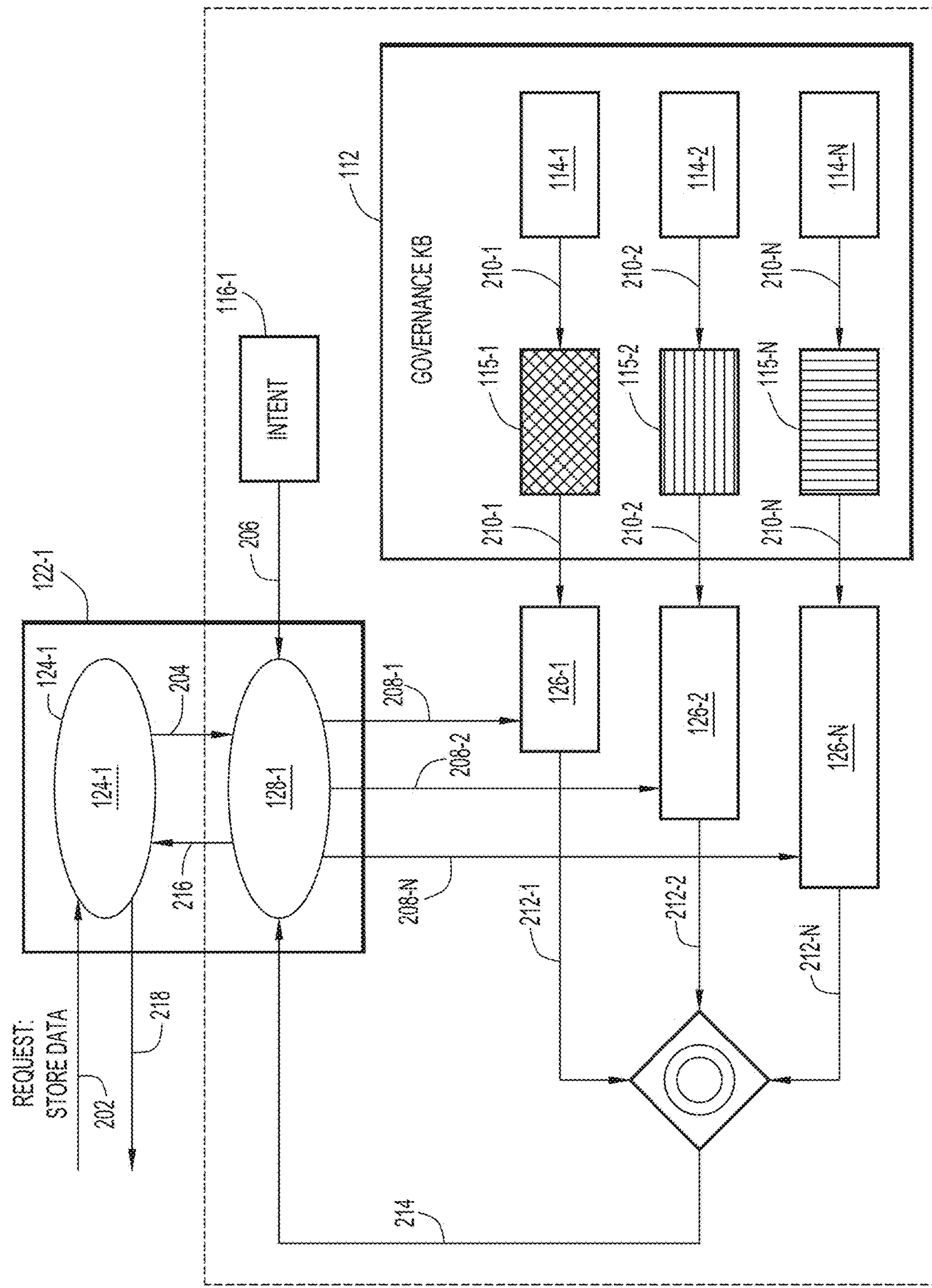
FIG. 2 is a diagram illustrating a method of determining whether a request to store data at a data product instance of a data mesh is valid, according to an example embodiment.

Reference is now made to FIG. 2, with continued reference to FIG. 1. FIG. 2 shows a diagram illustrating a method of determining whether a request to store data at a data product instance of a data mesh is valid. Method 200 may be performed by data armor 124-1 and policy enforcer 128-1 of data product instance 122-1 in conjunction with governance modules 126-1 to 126-N, governance groups 114-1 to 114-N, and/or additional devices not illustrated in FIG. 2.

In the example illustrated in FIG. 2, assume data product instance 122-1 is a microservice that controls data sets collected from a videoconference session where a videoconference assistant was used for a meeting physically and virtually taking place in Germany. The transcript of the meeting is a data set managed by data product instance 122-1 and being protected by data armor 124-1 through policies compiled from policy metadata 115-1 to 115-N and the intent 116-1 is for the transcript of the meeting to be stored in Europe and shared only with a small set of employees after it has already been stored in the data repository.

For example, for the intent 116-1, the data owner specifies (1) governance rules related to data sovereignty while creating backups of data collected from Germany, and (2) governance rules related to anonymization while retrieving data to be consumed by an entity (e.g., a user or service) with a specific role. In this example, governance modules 126-1 to 126-N may include a sovereignty governance module, an anonymization governance module, an encryption governance module, etc.

As illustrated in FIG. 2, at 202, a request associated with data (e.g., the transcript) is received at data product instance 122-1 and blocked by data armor 124-1. In this example, the request is a request to store data. For example, an input data port of data product instance 122-1 may collect the data through APIs, streamed data, or batched data. In other implementations, the request may be a request to perform a different action with respect to data (e.g., access the data, backup the data, delete the data, etc.).

At 204, the data is intercepted by policy enforcer 128-1. For example, policy enforcer 128-1 may intercept the data so that the data is not stored until policy enforcer 128-1 determines that the request to store the data is a valid request. Based on intercepting the data, policy enforcer 128-1 is activated to process the new request. At 206, policy enforcer 128-1 receives data for that latest intent 116-1 and, at 208-1, 208-2, . . . 208-N, policy enforcer 128-1 transmits the data for the latest intent 116-1 to respective governance modules 126-1 to 126-N. In this example, policy enforcer 128-1 may push sovereignty intents to the sovereignty governance module, push anonymization intents to the anonymization governance module, etc.

According to implementations described herein, policy enforcer 128-1 may operate in a proactive mode or a reactive mode. When operating in a proactive mode, policy enforcer 128-1 may continuously or periodically receive intents 116-1 to 116-N and push the intents 116-1 to 116-N to governance modules 126-1 to 126-N so the governance modules 126-1 to 126-N are up to date with the latest policies. In this example, policy enforcer 128-1 is operating in a reactive mode in which policy enforcer 128-1 performs operations in response to data product instance 122-1 receiving a request with respect to data.

At 210-1, 210-2, . . . 210-N, governance modules 126-1 to 126-N pull latest policy metadata 115-1 to 115-N from corresponding governance groups 114-1 to 114-N in governance knowledge base 112. For example, a sovereignty governance module may pull sovereignty policy metadata from the sovereignty governance group of governance knowledge base 112, the anonymization governance module may pull anonymization policy metadata from the anonymization governance group of governance knowledge base 112, etc.

In the example described with respect to FIG. 2, the sovereignty governance module may have received an intent from policy enforcer 128-1 to apply/verify that "German sovereignty policies are applied when creating data backups of data sets controlled by the current data product instance" and, in response, the sovereignty governance module may pull the "German Sovereignty Policy Metadata" from the sovereignty governance group of the governance knowledge base 112.

After receiving the intent 116-1 from policy enforcer 128-1 and the policy metadata 115-1 to 115-N from governance groups 114-1 to 114-N, each governance module 126-1 to 126-N perform rule validation and determine policy compliance with respect to the request to store data based on the intent data 116-1 and policy metadata 115-1 to 115-N. Each governance module 126-1 to 126-N performs the validation for the governance type or aspect associated with the governance module. In this example, the sovereignty governance module verifies that the policies in the metadata from the sovereignty governance group are met or can be met in case of a dataset creation. The sovereignty governance module verifies the "state" of the stored/backup data sets and ensures it is compliant with the desired intent. Because the policy metadata is continuously being received, if the policies in the policy metadata change at any time, the latest polices are always applied.

At 212-1, 212-2, . . . 212-N, each governance module 126-1 to 126-N outputs the results of the verification and, at 214, policy enforcer 128-1 receives the results from the governance modules 126-1 to 126-N. Depending on the intent, the outcome could be, for example, (1) the request can be approved/denied because polices are met/not met, or (2) actions to apply if the policies are changed at runtime. In the first case, if all governance modules 126-1 to 126-N return positive results, at 216, policy enforcer 128-1 reports the positive result to data armor 124-1 along with any details needed to complete the request associated with the data (e.g., details needed to store the data). If any governance module 126-1 to 126-N reports a compliance breach (where the request is not valid for one or more governance modules of governance modules 126-1 to 126-N), then the request is stopped and rejected (denied).

In the second case, if policy enforcer 128-1 detects a compliance breach or broken policy due to intent 116-1 or policy metadata 115-1 to 115-N updates, the policy enforcer 128-1 attempts to fix the request to reflect the desired intent. If the policies are changed at runtime, a governance module 126-1 to 126-N may issues "actions" to policy enforcer 128-1. For example, if the policy changes from allowing storage of the data product instance datasets from "anywhere" to "Europe only," and the current state violates this intent, sovereignty governance module may issue a command to policy enforcer 128-1 to move data sets of the respective data product instance to regions in Europe. Policy enforcer 128-1 takes these actions and communicates the actions to the data armor 124-1. Data armor 124-1 executes the command, which brings the data set to the desired state indicated by the intent.

At 218, when the request associated with the data is approved, the request is completed and the positive outcome is reported to the requestor. In this example, the data is stored and an indication that the data has been stored is transmitted to a user who requested that the data be stored.

As discussed above, embodiments discussed herein translate policies put forth by data owners into policy metadata. The policies are broken into groups of similar governance types (e.g., sovereignty, anonymization, etc.). Separating the policies into groups based on governance types helps achieve separation of concern into groups of policies to be applied upon various types of intents. The intents are created by a set of business rules or operation process rules and allows a level of granularity to specify the intent per accepted behavior of the data product. The behaviors are translated into intent metadata.

The policy enforcer of a data product instance continuously pulls intents specified by the data owner of the data product instances and pushes respective intents to respective data governance modules. Each data governance module is associated with a governance type and receives policy metadata from a governance group associated with the same governance type. The data governance modules perform rule validation and policy compliance with respect to requests associated with data at a data product instance based on the intents specified by the data owner and the policy data associated with the governance group.

Reference is now made to FIG. 3. FIG. 3 is a flow diagram illustrating a method 300 of determining whether a request associated with data stored in a data mesh is valid. Method 300 may be performed by governance modules 126-1 to 126-N in combination with other devices, systems, and/or nodes, (e.g., data armor 124-1 to 124-N, policy enforcer 128-1 to 128-N, data product instance 122-1 to 122-N, governance groups 114-1 to 114-N, etc.).

At 310, each module of a plurality of modules receives intent metadata associated with a data product instance of a data mesh. Each module corresponds to a unique data governance category of a plurality of data governance categories. A request associated with data was intercepted at the data product instance. For example, a request associated with data stored at a data mesh may have been blocked by data armor 124-1 to 124-N of a data product instance 122-1 to 122-N and intercepted by policy enforcer 128-1 to 128-N of the data product instance 122-1 to 122-N. Policy enforcer 128-1 to 128-N may transmit intents 116-1 to 116-N to respective governance modules 126-1 to 126-N based on intercepting the request.

At 320, each module receives policy metadata associated with the data governance category corresponding to the module. For example, each governance module 126-1 to 126-N receives policy metadata 115-1 to 115-N from a governance group 114-1 to 114-N in governance knowledge base 112 that is associated with the same data governance category as the governance module 126-1 to 126-N.

At 330, each module determines, based on the intent metadata and the policy metadata, whether the request is valid for the data governance category corresponding to the module. For example, each governance module 126-1 to 126-N determines whether the request associated with the data is valid based on the intents 116-1 to 116-N and the policy metadata 115-1 to 115-N associated with the data governance category corresponding to the governance module 126-1 to 126-N.

At 340, each module transmits an indication of whether the request is valid for the module. For example, each governance module 126-1 to 126-N transmits an indication of whether the request is valid for the particular governance module to policy enforcer 128-1 to 128-N.

According to embodiments described herein, the data mesh concept is leveraged and augmented with capabilities to armor data product boundaries, express declarative intents, and enforce polices and rules from intents, as code. The intents are guaranteed at any time and any update would be reflected in a timely manner.

Figure 4:
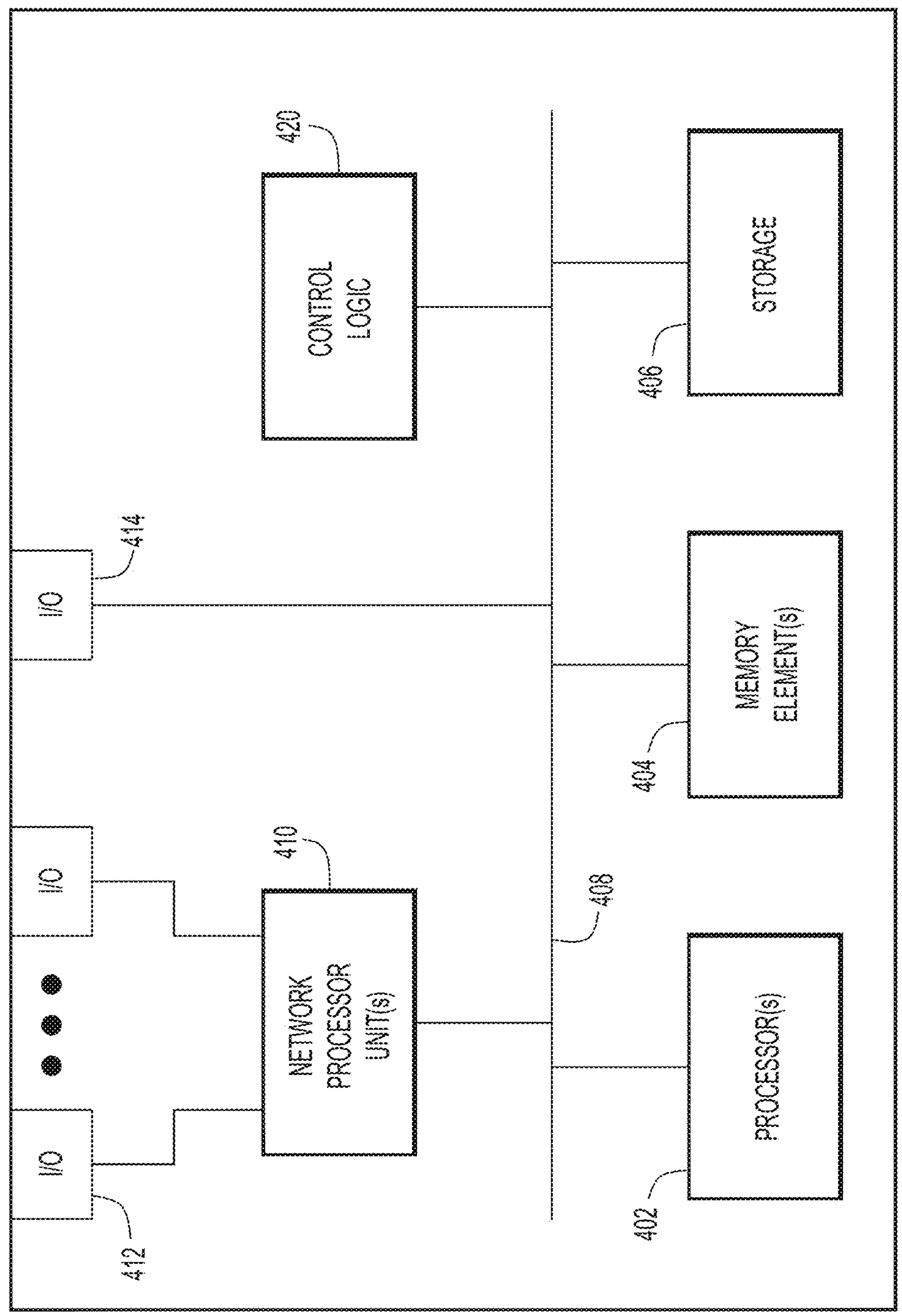
FIG. 4 is a hardware block diagram of a device that may be configured to perform the operations involved in determining whether a request associated with data at a data mesh is valid, according to an example embodiment.

Referring to FIG. 4, FIG. 4 illustrates a hardware block diagram of a computing/computer device 400 that may perform functions of a device associated with operations discussed herein in connection with the techniques depicted in FIGS. 1-3. In various embodiments, a computing device, such as computing device 400 or any combination of computing devices 400, may be configured as any devices as discussed for the techniques depicted in connection with FIGS. 1-3 in order to perform operations of the various techniques discussed herein.

In at least one embodiment, the computing device 400 may include one or more processor(s) 402, one or more memory element(s) 404, storage 406, a bus 408, one or more network processor unit(s) 410 interconnected with one or more network input/output (I/O) interface(s) 412, one or more I/O interface(s) 414, and control logic 420. In various embodiments, instructions associated with logic for computing device 400 can overlap in any manner and are not limited to the specific allocation of instructions and/or operations described herein.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., a hardware processor) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory element(s) 404 (or vice versa), or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 410 may enable communication between computing device 400 and other systems, entities, etc., via network I/O interface(s) 412 (wired and/or wireless) to facilitate operations discussed for various embodiments described herein. Examples of wireless communication capabilities include short-range wireless communication (e.g., Bluetooth), wide area wireless communication (e.g., 4G, 5G, etc.). In various embodiments, network processor unit(s) 410 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 412 can be configured as one or more Ethernet port(s), Fibre Channel ports, any other I/O port(s), and/or antenna(s)/antenna array(s) now known or hereafter developed. Thus, the network processor unit(s) 410 and/or network I/O interface(s) 412 may include suitable interfaces for receiving, transmitting, and/or otherwise communicating data and/or information in a network environment.

I/O interface(s) 414 allow for input and output of data and/or information with other entities that may be connected to computing device 400. For example, I/O interface(s) 414 may provide a connection to external devices such as a keyboard, keypad, a touch screen, and/or any other suitable input and/or output device now known or hereafter developed. This may be the case, in particular, when the computing device 400 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, particularly when the computing device 400 serves as a user device as described herein.

In various embodiments, control logic 420 can include instructions that, when executed, cause processor(s) 402 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or nonvolatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 404 and/or storage 406 can store data, software, code, instructions (e.g., processor instructions), logic, parameters, combinations thereof, and/or the like used for operations described herein. This includes memory element(s) 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided comprising: receiving, at each module of a plurality of modules, intent metadata associated with a data product instance of a data mesh, wherein each module corresponds to a unique data governance category of a plurality of data governance categories, and wherein a request associated with data was intercepted at the data product instance; receiving, at each module, policy metadata associated with the data governance category corresponding to the module; determining, at each module and based on the intent metadata and the policy metadata, whether the request is valid for the data governance category corresponding to the module; and transmitting, by each module, an indication of whether the request is valid for the module.

In one example, the computer-implemented method further comprises transmitting details for completing the request when the request is valid for each module of the plurality of modules. In another example, the computer-implemented method further comprises rejecting the request when the request is not valid for one or more module of the plurality of modules. In another example, the policy metadata is derived from policies set by a data owner of the data product instance, the policies being divided into groups corresponding to the plurality of data governance categories. In another example, the plurality of data governance categories includes a data sovereignty category and a data anonymization category. In another example, the intent metadata includes information associated with policies to be applied to the data product instance for data product class behaviors. In another example, the computer-implemented method further comprises periodically receiving new or updated intent metadata and policy.

In another form, a system is provided comprising one or more memories storing instructions; and one or more processors, operatively coupled to the one or more memories, configured to execute the instructions to perform operations comprising: receiving, at each module of a plurality of modules, intent metadata associated with a data product instance of a data mesh, wherein each module corresponds to a unique data governance category of a plurality of data governance categories, and wherein a request associated with data was intercepted at the data product instance; receiving, at each module, policy metadata associated with the data governance category corresponding to the module; determining, at each module and based on the intent metadata and the policy metadata, whether the request is valid for the data governance category corresponding to the module; and transmitting, by each module, an indication of whether the request is valid for the module.

In yet another form, one or more non-transitory computer readable storage media encoded with instructions are provided that, when executed by a processor of a user device, cause the processor to execute a method comprising: receiving, at each module of a plurality of modules, intent metadata associated with a data product instance of a data mesh, wherein each module corresponds to a unique data governance category of a plurality of data governance categories, and wherein a request associated with data was intercepted at the data product instance; receiving, at each module, policy metadata associated with the data governance category corresponding to the module; determining, at each module and based on the intent metadata and the policy metadata, whether the request is valid for the data governance category corresponding to the module; and transmitting, by each module, an indication of whether the request is valid for the module.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

What is claimed is:

1. A computer-implemented method comprising:

receiving, at a data product instance of a data mesh, a request associated with data;

blocking, by a data armor associated with the data product instance, the request;

intercepting, by a policy enforcer associated with the data product instance, the data;

obtaining, by the policy enforcer, intent metadata associated with the data product instance, the intent metadata including types of intent data associated with a plurality of data governance categories;

transmitting, by the policy enforcer, a type of the intent metadata to each module of a plurality of modules, each module being associated with a unique data governance category of the plurality of data governance categories, the type of the intent metadata being transmitted to each module being associated with a same data governance category as the module;

receiving, at each module of the plurality of modules, the type of the intent metadata associated with the data product instance that corresponds to the data governance category of the module;

determining, at each module, which policy metadata associated with the data governance category corresponding to the module to obtain based on the intent metadata that is received;

obtaining, at each module and based on determining which policy metadata to obtain, the policy metadata associated with the data governance category corresponding to the module, wherein the policy metadata is obtained from a governance group that stores updated policy metadata for the data governance category corresponding to the module, wherein the governance group is one of a plurality of governance groups in a knowledge base, and wherein each of the plurality of governance groups in the knowledge base is associated with a different governance category;

determining, at each module and based on the intent metadata and the policy metadata, whether the request is valid for the data governance category corresponding to the module;

transmitting, by each module, an indication of whether the request is valid for the module;

approving, by the policy enforcer, the request associated with the data when the request is valid for each module; and denying, by the policy enforcer, the request associated with the data when the request is not valid for at least one module.

2. The computer-implemented method of claim 1, further comprising:

transmitting details for completing the request when the request is valid for each module of the plurality of modules.

3. The computer-implemented method of claim 1, further comprising:

rejecting the request when the request is not valid for one or more module of the plurality of modules.

4. The computer-implemented method of claim 1, wherein the policy metadata is derived from policies set by a data owner of the data product instance, the policies being divided into groups corresponding to the plurality of data governance categories.

5. The computer-implemented method of claim 1, wherein the plurality of data governance categories includes a data sovereignty category and a data anonymization category.

6. The computer-implemented method of claim 1, wherein the intent metadata includes information associated with policies to be applied to the data product instance for data product class behaviors.

7. The computer-implemented method of claim 1, further comprising periodically receiving new or updated intent metadata and policy metadata.

8. A system comprising:

one or more memories storing instructions; and one or more processors, operatively coupled to the one or more memories, configured to execute the instructions to perform operations comprising:

receiving, at a data product instance of a data mesh, a request associated with data;

blocking, by a data armor associated with the data product instance, the request;

intercepting, by a policy enforcer associated with the data product instance, the data;

obtaining, by the policy enforcer, intent metadata associated with the data product instance, the intent metadata including types of intent data associated with a plurality of data governance categories;

transmitting, by the policy enforcer, a type of the intent metadata to each module of a plurality of modules, each module being associated with a unique data governance category of the plurality of data governance categories, the type of the intent metadata being transmitted to each module being associated with a same data governance category as the module;

receiving, at each module of the plurality of modules, the type of the intent metadata associated with the data product instance that corresponds to the data governance category of the module;

determining, at each module, which policy metadata associated with the data governance category corresponding to the module to obtain based on the intent metadata that is received;

obtaining, at each module and based on determining which policy metadata to obtain, the policy metadata associated with the data governance category corresponding to the module, wherein the policy metadata is obtained from a governance group that stores updated policy metadata for the data governance category corresponding to the module, wherein the governance group is one of a plurality of governance groups in a knowledge base, and wherein each of the plurality of governance groups in the knowledge base is associated with a different governance category;

determining, at each module and based on the intent metadata and the policy metadata, whether the request is valid for the data governance category corresponding to the module;

transmitting, by each module, an indication of whether the request is valid for the module;

approving, by the policy enforcer, the request associated with the data when the request is valid for each module; and denying, by the policy enforcer, the request associated with the data when the request is not valid for at least one module.

9. The system of claim 8, wherein the one or more processors are further configured to perform operations comprising:

transmitting details for completing the request when the request is valid for each module of the plurality of modules.

10. The system of claim 8, wherein the one or more processors are further configured to perform operations comprising:

rejecting the request when the request is not valid for one or more module of the plurality of modules.

11. The system of claim 8, wherein the policy metadata is derived from policies set by a data owner of the data product instance, the policies being divided into groups corresponding to the plurality of data governance categories.

12. The system of claim 8, wherein the plurality of data governance categories includes a data sovereignty category and a data anonymization category.

13. The system of claim 8, wherein the intent metadata includes information associated with policies to be applied to the data product instance for data product class behaviors.

14. The system of claim 8, wherein the one or more processors are further configured to perform operations comprising:

periodically receiving new or updated intent metadata and policy metadata.

15. One or more non-transitory computer readable storage media encoded with instructions that, when executed by one or more processors, cause the one or more processors to execute a method comprising:

receiving, at a data product instance of a data mesh, a request associated with data;

blocking, by a data armor associated with the data product instance, the request;

intercepting, by a policy enforcer associated with the data product instance, the data;

obtaining, by the policy enforcer, intent metadata associated with the data product instance, the intent metadata including types of intent data associated with a plurality of data governance categories;

transmitting, by the policy enforcer, a type of the intent metadata to each module of a plurality of modules, each module being associated with a unique data governance category of the plurality of data governance categories, the type of the intent metadata being transmitted to each module being associated with a same data governance category as the module;

receiving, at each module of the plurality of modules, intent metadata associated with the data product instance that corresponds to the data governance category of the module;

determining, at each module, which policy metadata associated with the data governance category corresponding to the module to obtain based on the intent metadata that is received;

obtaining, at each module and based on determining which policy metadata to obtain, the policy metadata associated with the data governance category corresponding to the module, wherein the policy metadata is obtained from a governance group that stores updated policy metadata for the data governance category corresponding to the module, wherein the governance group is one of a plurality of governance groups in a knowledge base, and wherein each of the plurality of governance groups in the knowledge base is associated with a different governance category;

determining, at each module and based on the intent metadata and the policy metadata, whether the request is valid for the data governance category corresponding to the module;

transmitting, by each module, an indication of whether the request is valid for the module;

approving, by the policy enforcer, the request associated with the data when the request is valid for each module; and denying, by the policy enforcer, the request associated with the data when the request is not valid for at least one module.

16. The one or more non-transitory computer readable storage media of claim 15, wherein the method further comprises:

transmitting details for completing the request when the request is valid for each module of the plurality of modules.

17. The one or more non-transitory computer readable storage media of claim 15, wherein the method further comprises:

rejecting the request when the request is not valid for one or more module of the plurality of modules.

18. The one or more non-transitory computer readable storage media of claim 15, wherein the policy metadata is derived from policies set by a data owner of the data product instance, the policies being divided into groups corresponding to the plurality of data governance categories.

19. The one or more non-transitory computer readable storage media of claim 15, wherein the intent metadata includes information associated with policies to be applied to the data product instance for data product class behaviors.

20. The one or more non-transitory computer readable storage media of claim 15, the method further comprising periodically receiving new or updated intent metadata and policy metadata.

* * * * *